United States Patent [19]

Heuscher

[11] Patent Number: 6,078,639
[45] Date of Patent: Jun. 20, 2000

[54] REAL TIME CONTINUOUS CT IMAGING

[75] Inventor: Dominic J. Heuscher, Aurora, Ohio

[73] Assignee: Picker International, Inc., Highland Heights, Ohio

[21] Appl. No.: 08/979,996

[22] Filed: Nov. 26, 1997

[51] Int. Cl.[7] ....................................................... A61B 6/03
[52] U.S. Cl. ............................................. 378/15; 378/901
[58] Field of Search .................................. 378/4, 15, 901

[56] References Cited

U.S. PATENT DOCUMENTS

| | | | |
|---|---|---|---|
| 4,580,219 | 4/1986 | Pelc et al. | 378/4 |
| 4,707,822 | 11/1987 | Hopkinson et al. | |
| 4,979,111 | 12/1990 | Nishimura | |
| 5,406,479 | 4/1995 | Harman | 378/7 |

FOREIGN PATENT DOCUMENTS

| | | |
|---|---|---|
| 0395762 A1 | 11/1990 | European Pat. Off. |
| 0717955 A1 | 6/1996 | European Pat. Off. |
| 3604375 A1 | 8/1986 | Germany |

OTHER PUBLICATIONS

Medical Review No. 60, Continuous Imaging—CT Fluoroscopy—Guided Biopsy and Applications, Phillip A. Templeton, M.D.

*Primary Examiner*—David V. Bruce
*Attorney, Agent, or Firm*—Fay, Sharpe, Fagan, Minnich & McKee, LLP

[57] ABSTRACT

A continuous CT scanner (10) for producing real time images includes a stationary gantry portion (12) having an examination region (14) and a rotating gantry portion (20) for continuous rotation about the examination region (14). Mounted to the rotating gantry portion (20) is an imaging x-ray source (22) which produces a fan-shaped x-ray beam (24) having a plurality of rays through the examination region (14). A plurality of radiation detectors (28) are mounted to one of the rotating and stationary gantry portions (20, 12) and are arranged to receive rays of the fan-shaped x-ray beam (24) after the rays have passed through the examination region (14). The plurality of radiation detectors (28) converts detected radiation into electronic data wherein the electronic data includes a plurality of data lines in a fan beam format. A rebinning processor (30) interpolates the electronic data from the fan-beam format to a parallel-beam format. A reconstruction processor (50) then convolves and backprojects the electronic data to form in real time an image representation of a subject (52) within the examination region (14). The increased data collection rate and data processing rates allow for real time image updating.

20 Claims, 3 Drawing Sheets

REAL TIME CONTINUOUS CT IMAGING

BACKGROUND OF THE INVENTION

The present invention relates to the CT imaging arts. The invention finds particular application in conjunction with real time continuous CT imaging and will be described with particular reference thereto. However, it is to be appreciated that the present invention will also find application in conjunction with other types of CT imaging apparatus and techniques, as well as other diagnostic imagers.

Early CT scanners were of a traverse and rotate type. That is, a radiation source and oppositely disposed radiation detector traversed together along linear paths on opposite sides of a subject. The detector was repeatedly sampled during the traverse to create a plurality of data values representing parallel rays through the subject. After the traverse, the entire carriage was rotated a few degrees and the source and detector were traversed again to create a second data set. The plurality of parallel ray data sets at regular angular intervals over 180° were reconstructed into a diagnostic image. Unfortunately, the traverse and rotate technique was very slow.

One technique for speeding traverse and rotate scanners was to replace the radiation source and single detector with a radiation source that projected radiation along a narrow fan beam and to provide several detectors such that a plurality of parallel ray data sets at different angles were collected concurrently. In this manner, several of the data sets could be collected concurrently. This was several times faster, but still very slow.

Rather than traversing the source and detector, it was found that the radiation source could be rotated only. That is, the radiation source projected a fan of data which spanned the examination region. An arc of radiation detectors received the radiation which traversed the examination region. The radiation source was rotated around the subject. In a third generation scanner, the arc of detectors rotated with the source. In a fourth generation scanner, an entire ring of the stationary detectors was provided. In either type, fan beam data sets were sampled at a multiplicity of a apexes around the subject. The data from the different angles within the fans at different angular orientations of the fan were sorted into parallel ray data sets. It was found that a complete set of parallel ray data sets could be generated by rotating the source 180° plus the fan angle. Although much faster than the traverse and rotate technique, a larger amount of data processing was required to sort or rebin the rays into the parallel ray data sets and to interpolate, as necessary, in order to make the rays within each data set more parallel. Although the data collection time was much faster, the image processing was slower. Parallel beam reconstruction was abandoned largely due to memory and speed limitations, as well as due to inaccuracy of the rebinning step when performed early in the processing chain without accurate detector corrections and angular view filtering, especially when a limited number of views were collected.

Rather than sorting the data into parallel ray data sets, it was found that the fan beam data sets could be reconstructed directly into an image representation by convolution and backprojection. Although the convolution and backprojection technique required significantly less processing hardware and time than the rebidding technique, the data collection was slower. In particular, the algorithm required the apexes of the data fans to span a full 360°, not just the 180+ fan angle.

More recently, improved convolution and backprojection techniques in which the apexes of the data fans need only span 180° plus the fan angle have been developed. While today these techniques are among the most widely used CT reconstruction algorithms, they still have drawbacks. In particular, they can be computationally complex and time consuming.

While successful for their intended uses, the previously described CT scanners and techniques have inherent drawbacks which make them unsuitable for real time imaging. In particular, the various combinations of data collection and data processing techniques are too time consuming to allow for accurate continuous image updating in real time.

The present application contemplates a new and improved CT scanner which overcomes the above-referenced problems and others.

SUMMARY OF THE INVENTION

In accordance with an aspect of the present invention, a continuous CT scanner for producing a real time image is provided. The scanner includes a stationary gantry portion having an examination region and a rotating gantry portion for continuous rotation about the examination region. An imaging x-ray source is mounted to the rotating gantry portion and produces a fan-shaped x-ray beam having a plurality of rays through the examination region. A plurality of radiation detectors are mounted to one of the rotating and stationary gantry portions. The radiation detectors are arranged to receive rays of the fan-shaped x-ray beam after the rays have passed through the examination region. The plurality of radiation detectors convert detected radiation into electronic data. The electronic data includes a plurality of data lines in a fan-beam format. A rebinning processor interpolates the electronic data from the fan-beam format to a parallel-beam format. A reconstruction processor then takes the electronic data in the parallel beam format and convolves and backprojects it to form in real time an image representation of a subject within the examination region.

In accordance with a more limited aspect of the present invention, a first rolling buffer is provided for storing the electronic data generated by the radiation detectors. An angular view filter then filters the electronic data and writes it into a preset location of a second rolling buffer. The rebinning processor retrieves the filtered electronic data from the second rolling buffer and interpolates it into the parallel-beam format.

In accordance with a more limited aspect of the present invention, the angular view filter is applied to a plurality of adjacent data lines to generate a weighted average thereof.

In accordance with a more limited aspect of the present invention, the weighted average is characterized by a centered symmetric non-linear function.

In accordance with a more limited aspect of the present invention, the reconstruction processor forms an initial image representation from a plurality of backprojected data lines stored in an image memory and repeatedly updates the initial image representation to achieve a real time image representation.

In accordance with a more limited aspect of the present invention, the reconstruction processor updates the initial image representation by repeatedly reloading the image memory with a backprojection of a plurality of data lines that correspond to a new full image.

In accordance with a more limited aspect of the present invention, the initial image representation is made up of a plurality of sub-images which correspond to pluralities of data lines. Updates are accomplished by repeatedly backprojecting a new sub-image, subtracting a previously backprojected sub-image that is 180° apart from the new sub-image, and superimposing the difference on the image memory.

In accordance with a more limited aspect of the present invention, the updates are accomplished by taking a difference between a currently acquired plurality of data lines and a corresponding plurality of data lines previously acquired which are 180° apart from therefrom and inverted, and backprojecting the difference into the image memory.

In accordance with a more limited aspect of the present invention, the difference is taken at any time prior to its backprojection when the electronic data is in parallel-beam format.

In accordance with a more limited aspect of the present invention, the backprojected data lines of the image representation are weighted by a unity function having tapered ends. Those backprojected data lines at extremes under the tapered ends have less effect on the real time image representation than those backprojected data lines at a center which are unity weighted.

In accordance with a more limited aspect of the present invention, a human readable display is provided which displays the real time image representation of the subject. The display also selectively illuminates indicia to indicate in real time the status the fan-shaped x-ray beam and the operator's controls.

In accordance with another aspect of the present invention, a method of producing a continuous real time image is provided. The method includes rotating an x-ray source about an examination region and producing a fan-shaped x-ray beam having a plurality of rays passing through the examination while the x-ray source is rotating. The rays of the fan-shaped x-ray beam are received after they have traversed the examination region. The received rays are converted to electronic data having a fan-beam format and then are interpolated from the fan-beam format to a parallel-beam format. Using the interpolated electronic data, an image representation of a subject within the examination region is reconstructed and updated in real time.

In accordance with a more limited aspect of the present invention, the reconstructing and updating step includes convolving the interpolated electronic data and backprojecting the convolved data to reconstruct and update the image representation in real time.

In accordance with a more limited aspect of the present invention, the step of interpolating includes angular view filtering across data lines corresponding to the received rays, sorting the data lines corresponding to the rays which are parallel to one another into groups wherein spacing within the groups is unequal, and adjusting the spacing within the groups to be equal.

In accordance with a more limited aspect of the present invention, prior to angularly view filtering the data lines, the data lines are stored in a first rolling buffer. After the data lines have been angularly view filtered, the data lines are then stored in a second rolling buffer.

In accordance with another aspect of the present invention, a data processor is provided for in a continuous CT scanner for producing a real time image having a stationary gantry portion defining an examination region, a rotating gantry portion for continuous rotation about the examination region, an imaging x-ray source mounted to the rotating gantry portion which produces a fan-shaped x-ray beam having a plurality of rays through the examination region, and a plurality of radiation detectors mounted to one of the rotating and stationary gantry portions and arranged to receive rays of the fan-shaped x-ray beam from the imaging x-ray source after the rays pass through the examination region, wherein the plurality of radiation detectors convert detected radiation into a electronic data, the electronic data including a plurality of data lines in a fan-beam format. The data processor includes a rebinning processor which interpolates the electronic data from the fan-beam format to a parallel-beam format. The rebinning processor has a first rolling buffer which stores the electronic data generated by the radiation detectors, an angular view filter which filters the electronic data, a second rolling buffer which stores the filter electronic data, and a interpolator which converts the electronic data from a fan-beam format to a parallel beam format. The data processor also has a reconstruction processor which convolves and backprojects the electronic data in the parallel-beam format, to form in real time an image representation of a subject within the examination region.

In accordance with a more limited aspect of the present invention, the angular view filter is applied to a plurality of adjacent data lines to generate a weighted average thereof.

In accordance with a more limited aspect of the present invention, the image representation is repeatedly updated in real time by taking a currently acquired plurality of data lines and a previously acquired plurality of data lines 180° apart therefrom, and backprojecting their difference.

In accordance with another more limited aspect of the present invention, the image representation is repeatedly updated in real time by taking a currently acquired backprojection of a plurality of data lines corresponding to a new sub-image and a previously acquired backprojection of a plurality of data lines 180° apart therefrom corresponding to a prior sub-image, and subtracting the prior sub-image from the new sub-image.

One advantage of the present invention is that the temporal resolution and latency intrinsic to a real time continuous CT scan are achieved.

Another advantage of the present invention is that it permits a simpler backprojection process to be used and reduces the costs of a real time reconstruction processor without sacrificing image accuracy.

Another advantage of the present invention is that motion artifacts otherwise observed in other recursive prior art techniques are reduced.

Still further advantages of the present invention will become apparent to those of ordinary skill in the art upon a reading and understanding of the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
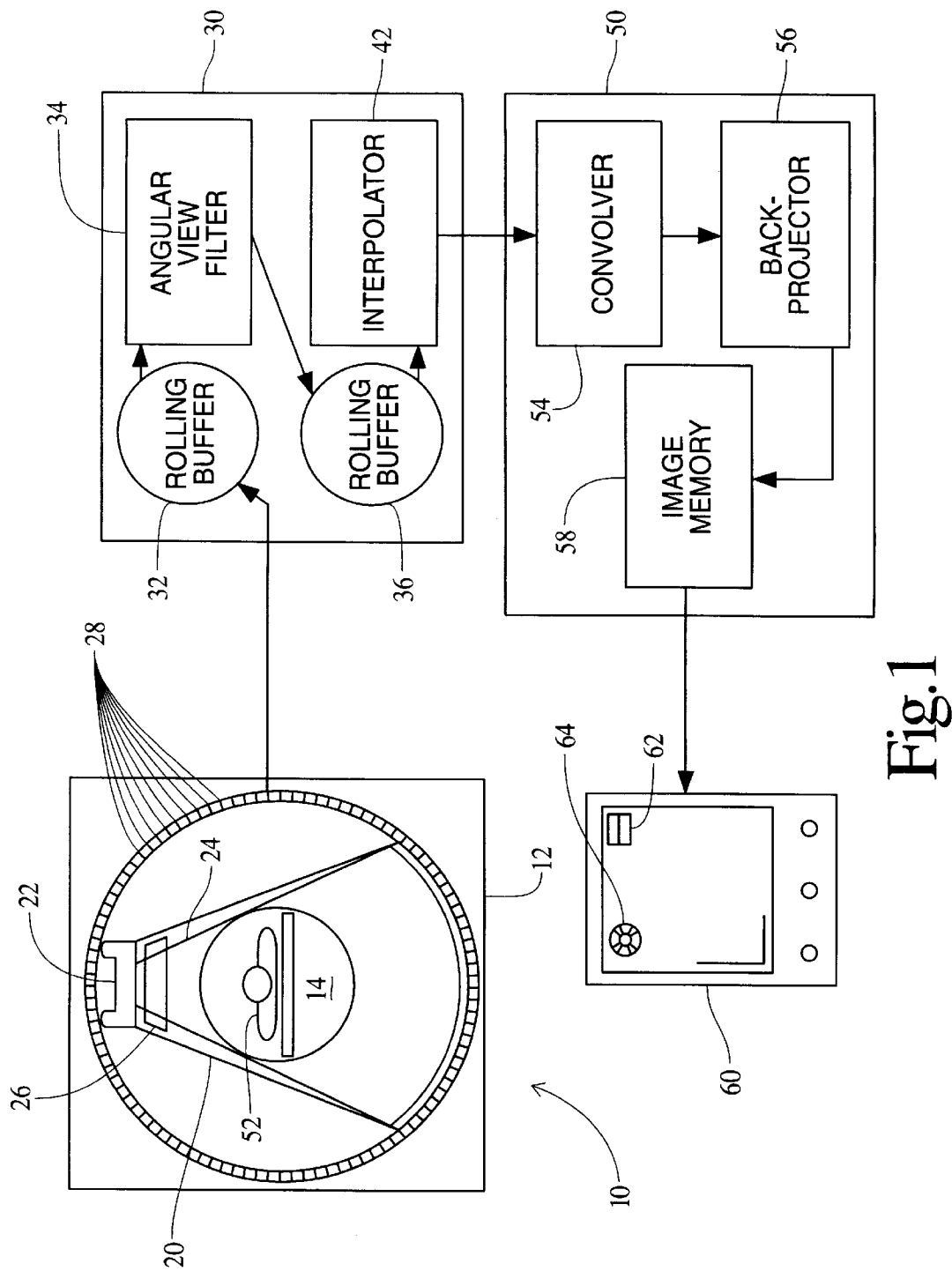
FIG. 1 is a diagrammatic illustration of a continuous CT scanner system in accordance with the present invention.

With reference to FIG. 1, a continuous CT scanner 10 includes a stationary gantry portion 12 which defines an examination region 14. A rotating gantry portion 20 is mounted on the stationary gantry portion 12 for continuous rotation about the examination region 14. An x-ray source 22, such as an x-ray tube, is arranged on the rotating gantry portion 20 such that a beam of radiation 24 passes through the examination region 14 as the rotating gantry portion 20 rotates. A collimator and shutter assembly 26 forms the beam of radiation 24 into a thin fan-shaped beam and selectively gates the beam 24 on and off. Alternately, the fan-shaped radiation beam 24 may also be gated on and off electronically at the x-ray source 22.

In the illustrated fourth generation CT scanner, a ring of radiation detectors 28 are mounted peripherally around the examination region 14 on the stationary gantry portion 12. Alternately, the radiation detectors 24 may be mounted on the rotating gantry portion 20 on a side of the examination region 14 opposite the x-ray source 22 such that they span the arc defined by the fan-shaped x-ray beam 24. Regardless of the configuration, the radiation detectors 28 are arranged to receive the x-ray radiation emitted from x-ray source 22 after it has traversed the examination region 14.

In a source fan geometry, an arc of detectors which span the radiation emanating from the source are sampled concurrently at short time intervals as the x-ray source 22 rotates behind the examination region 14 to generate a source fan view. In a detector fan geometry, each detector is sampled a multiplicity of times as the x-ray source 22 rotates behind the examination region 14 to generate a detector fan view. The path between the x-ray source 22 and each of the radiation detectors 28 is denoted as a ray.

The radiation detectors 28 convert the detected radiation into electronic data. That is to say, each of the radiation detectors produces an output signal which is proportional to an intensity of received radiation. Optionally, a reference detector may detect radiation which has not traversed the examination region 14. A difference between the magnitude of radiation received by the reference detector and each radiation detector 28 provides an indication of the amount of radiation attenuation along a corresponding ray of a sampled fan of radiation.

In the illustrated fourth generation scanner embodiment, each view or data line represents a fan of rays having its apex at one of the radiation detectors 28 collected over a short period of time as the x-ray source 22 rotates behind the examination region 14 from the detector. In a third generation scanner, each view or data line represents a fan of rays having an apex at the x-ray source 22 collected by concurrent sampling of all detectors.

Figure 2:
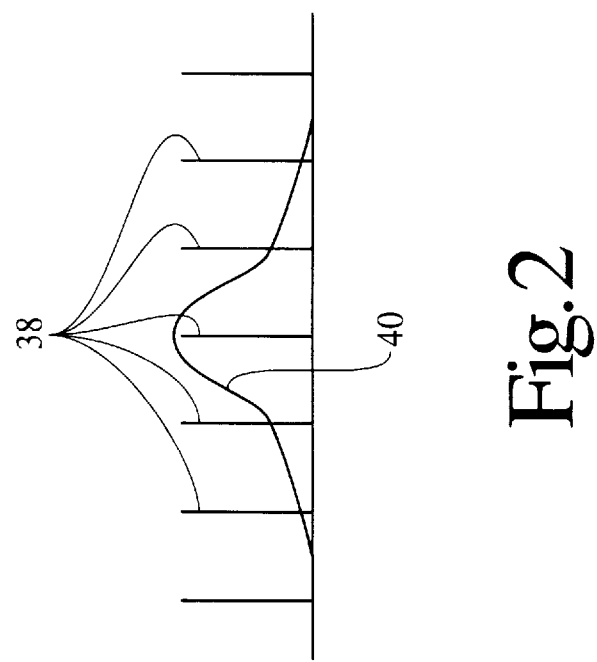
FIG. 2 is an exemplary illustration of the weighting function applied by the angular view filter in accordance with the present invention.

The electronic data generated by the radiation detectors 28 is fed to a rebinning processor 30. The rebinning processor 30 converts each data line from its fan-beam format to a parallel-beam format. In the interest of speed and accuracy, this process is broken down into three rebinning operations or steps: an angular view filtering step, an interpolation step which sorts the data into unequally spaced parallel rays, and a final interpretive step that corrects for the unequal spacing of the rays. The rebinning processor 30 initially receives the data lines into a first rolling buffer 32. An angular view filter 34 retrieves the data lines from the first rolling buffer 32, filters them, and writes them into a preset position in a second rolling buffer 36. Additionally, any detector-specific corrections may be made prior to writing the data into the second rolling buffer 36. Preferably, as illustrated in FIG. 2, the angular view filter is applied across a plurality of adjacent data lines 38, for example 3 to 5, to generate a weighted average thereof. The weighted average is characterized by a centered symmetric non-linear function 40. Further, at this stage associated view reduction contributes to reduced processing time.

Next, an interpolator 42 retrieves and reorders the data stored in the second rolling buffer 36 such that parallel rays from the various data lines are grouped together. Optionally, the number of data lines may be reduced by skipping data lines, for example, every other data line, in order to shorten the data processing time. Further, at this point, any corrections common to all the radiation detectors 28 may be made at this point. Next, an additional interpolative step is taken to equalize the spacing within each group of parallel data rays.

Figure 3:
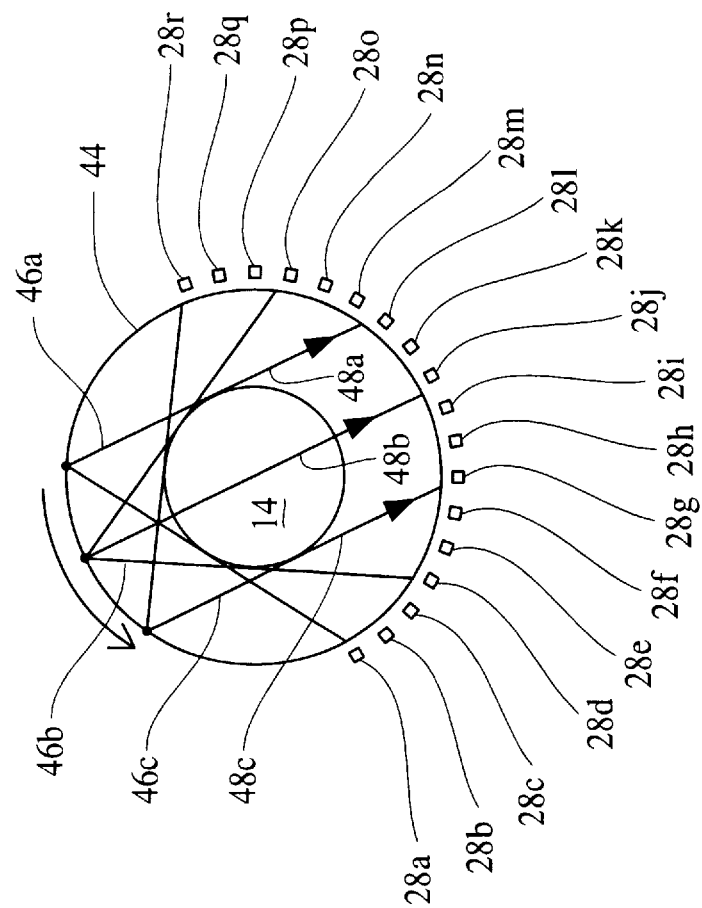
FIG. 3 is a diagrammatic illustration showing the interpolation of data from a fan-beam format to a parallel-beam format; and, FIG. 4 is a flow chart showing the data processing in accordance with aspects of the present invention.

With reference to FIG. 3 and continuing reference to FIG. 1, an illustrative drawing showing a source fan geometry is useful for describing the rebinning process. As the x-ray source 22 follows a trajectory 44 around the examination region 14, it generates a plurality of source fan views 46a–c with each incremental degree of rotation. Each source fan view 46a–c is received by an array of radiation detectors 28a–r which converts it into a data line having a fan-beam format. The source fan views, 46a–c are each made up of a plurality of rays with each ray corresponding to an individual radiation detector 28a–28r. For example, source fan view 46a includes rays corresponding to radiation detectors 28a–28l, source fan view 46b includes rays corresponding to radiation detectors 28d–28o, and 46c includes detectors 28f–28r. The interpolator 42 reorders the data to group the parallel rays 48a–c which correspond to radiation detectors 28l, 28i and 28f from respective fans 46a, 46b and 46c together to produce a parallel beam format.

After conversion from the fan-beam format to the parallel-beam format by the rebinning processor 30, a reconstruction processor 50 reconstructs an image representation of a subject 52 within the examination region 14 such that it may be viewed on a human viewable display, for example a video monitor 60. The reconstruction processor 50 employs a convolver 54 which convolves the data with a convolution or filter function. It will be noted that in the fourth generation scanner embodiment, as the x-ray source 22 moves, each radiation detector 28 is concurrently generating intensity data. In order to accommodate this rapid flow of information, the convolver 54 preferably includes a plurality of convolvers for convolving several data lines concurrently. The convolved data is conveyed to a backprojector 56 which backprojects the convolved data into an image memory 58 to reconstruct an electronic image representation.

In addition to displaying the real time image representation, video monitor 60 also displays or illuminates appropriate indicators or indicia 62, 64 which alert an operator of the status of the apparatus in real time. For example, suitable indicators include a signal that alerts an operator when a foot pedal that operates the x-ray source 22 is either engaged or disengaged and/or an indicator that alerts an operator when the fan shaped radiation beam 24 is on or off. Note that in some instances the radiation beam 24 may not instantly be on when the foot pedal is engaged therefore making dual indicia advantageous.

Figure 4:
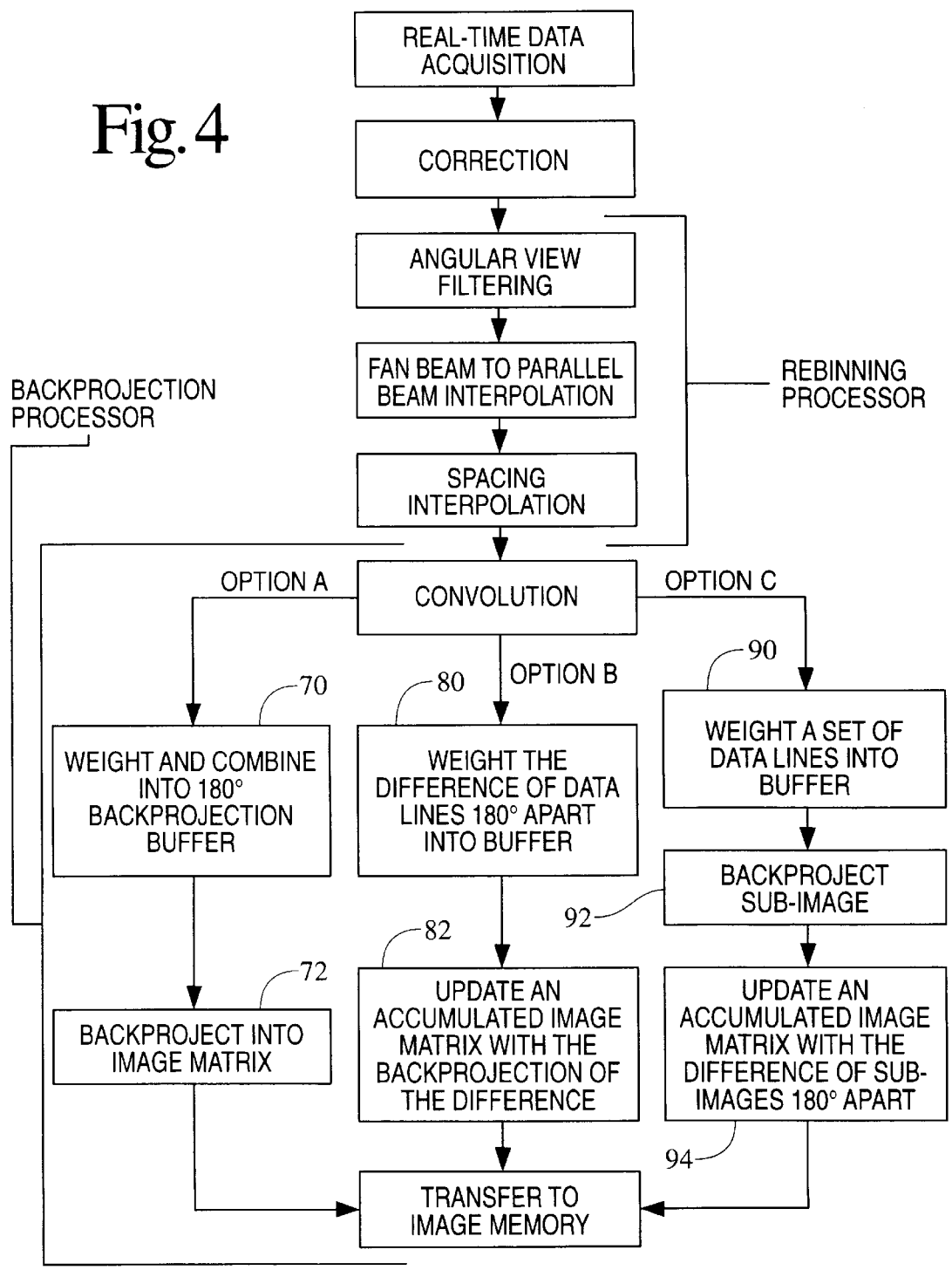

With reference to FIG. 4 and continuing reference to FIG. 1, in a preferred embodiment (Option A), a non-recursive backprojection technique is employed. The convolved data is weighted and combined into a 180° backprojection buffer 70, the 180° backprojection buffer is backprojected in to an image matrix 72, and the image matrix is transferred to the display buffer or image memory 58. In this manner, a backprojected image representing 180° of data lines is repeatedly loaded into the image memory 58 such that a real time reconstruction of an image representation is continually stored in the image memory 58. This technique provides relatively high image quality with considerable reduction in motion artifacts since the weighting function can be tapered well beyond 180° and can have any smooth shape, as long as all weigths 180° apart are summed while the data set gets combined into a single 180° backprojection data set for each image. Further, the backprojection time is constant and limited to the time it takes to backproject 180° of views for each new image.

In another preferred embodiment (option B), a recursive backprojection technique is employed wherein updating images is based upon a difference of view data. The difference between sets of data 180° apart are weighted into a difference buffer 80, an accumulated image matrix is updated with the backprojection of the difference buffer 82, and the image matrix is transferred to the display buffer of image memory 58. That is to say, the image memory 58 is initially loaded with a plurality of backprojected data lines, for example 180°, corresponding to an initial image representation. Thereafter, real time updating is accomplished by subtracting from a plurality of newly acquired data lines, for example 60+° worth of data lines, a corresponding plurality of flipped or inverted data lines from the previous image that are 180° apart from the newly acquired plurality of data lines, and then backprojecting the difference. Note that the recursive updating can reoccur on any appropriate angular increment of data lines as may be desirable for a given application, for example, more frequent updating at 30+° intervals. At the extreme, individual data lines 180° apart may be subtracted. Further, while this embodiment has been described as subtracting pluralities of data lines 180° apart immediately prior to backprojection, it is to be appreciated the difference may be taken at any point in the processing prior to the backprojection after the data has been made parallel. For example, prior to equally spacing the parallel data lines. In any event, when the data lines are eventually backprojected, in fact what is backprojected is the difference between those pluralities of data lines 180° apart.

In another preferred embodiment (Option C), a recursive backprojection technique with updating of images based on difference of image data is employed. Sets of data are weighted into a buffer 90, the buffer is backprojected as sub-image 92, sub-images 180° apart are subtracted and an accumulated image matrix is updated 94, and the image matrix is transferred to the display buffer or image memory 58. In this manner, the image memory 58 is loaded with an initial image representation which is made up of a plurality of sub-images. Real time updating is accomplished by backprojecting a sub-image which corresponds to a plurality of data lines, for example 60+°. A previously acquired backprojected sub-image 180° apart from the updating sub-image is subtracted therefrom and the difference applied to update the full image. As with the previous recursive technique, the angular increment which defines the sub-image may be varied depending upon the desired performance for different applications.

In the preferred embodiments wherein recursive backprojection is employed, the reduction of motion artifacts is possible by weighting the electronic data. This can be accomplished by employing an essentially unity weighted function with tapering regions at the ends of the weighting function. That is to say for example, the additional part of the data lines associated with each recursion may be those small number of data lines under the tapered regions of the function. If the number of views in the tapered regions are small, the impact on reconstruction time is minimal and is given by the formula: % Increase in Backprojection time= 100 * (# Extra Views for Tapering)/(# Views Between Updates). For example, % Increase in Backprojection time= 100 * (12 degrees extra for tapering)/(60 degrees between updates)=20%. Tapered weighting with up to 100% tapering may be used, increasing the backprojection time by two fold.

While the real time reconstruction herein has been disclosed with reference to data reconstruction on a 180° basis, it is to be appreciated that the data reconstruction may also be based on a 360° rotation of the x-ray source 22. That is to say, the apparatus may be configured to optimize any number of characteristics. For example, temporal resolution may be optimized at the cost of noise reduction and vice versa. Additionally, a uniform noise filter is optionally employed which optimizes a weighting function for uniform noise filtration. Still another variation involves a dynamic zoom operation wherein as the field of view is changed, the convolution kernel and one of the view filter and interpolator kernels is changed. Ultimately, it is a matter of determining the particular characteristics which would be most advantageous for the desired CT scan application.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A continuous CT scanner for producing a real time image comprising:

a stationary gantry portion having an examination region;

a rotating gantry portion for continuous rotation about the examination region;

an imaging x-ray source mounted to the rotating gantry portion which produces a fan shaped x-ray beam having a plurality of rays through the examination region;

a plurality of radiation detectors mounted to one of the rotating and stationary gantry portions and arranged to receive rays of the fan shaped x-ray beam from the imaging x-ray source after the rays pass through the examination region, wherein the plurality of radiation detectors convert detected radiation into electronic data, the electronic data including a plurality of data lines in a fan-beam format;

a rebinning processor which interpolates the electronic data from the fan-beam format to a parallel-beam format, said rebinning processor including:

a first rolling buffer which stores the electronic data generated by the radiation detectors;

an angular view filter which filters the electronic data; and, a second rolling buffer;

wherein, the angular view filter retrieves the electronic data from the first rolling buffer, filters the electronic data, and writes the filtered electronic data into a preset location in the second rolling buffer which stores the filtered electronic data such that the rebinning processor accesses the filtered electronic data stored in the second rolling buffer for interpolation into the parallel-beam format; and, a reconstruction processor which convolves and backprojects the electronic data in the parallel-beam format to form in real time an image representation of a subject within the examination region.

2. The continuous CT scanner of claim 1, further including:
a human readable display which displays the image representation of the subject in real time and selectively illuminates indicia to indicate a status of the x-ray beam and an operator's controls in real time.

3. The continuous CT scanner of claim 1, wherein the angular view filter is applied to a plurality of adjacent data lines to generate a weighted average thereof.

4. The continuous CT scanner of claim 3, wherein the weighted average is characterized by a centered symmetric non-linear function.

5. A continuous CT scanner for producing a real time image comprising:
a stationary gantry portion having an examination region;
a rotating gantry portion for continuous rotation, about the examination region;
an imaging x-ray source mounted to the rotating gantry portion which produces a fan shaped x-ray beam having a plurality of rays through the examination region;
a plurality of radiation detectors mounted to one of the rotating and stationary gantry portions and arranged to receive rays of the fan shaped x-ray beam from the imaging x-ray source after the rays pass through the examination region, wherein the plurality of radiation detectors convert detected radiation into electronic data, the electronic data including a plurality of data lines in a fan-beam format;
a rebinning processor which interpolates the electronic data from the fan-beam format to a parallel-beam format; and,
a reconstruction processor which convolves and backprojects the electronic data in the parallel-beam format to form in real time an image representation of a subject within the examination region, wherein the reconstruction processor forms an initial image representation from a plurality of backprojected data lines stored in an image memory and repeatedly updates the initial image representation to achieve a real time image representation.

6. The continuous CT scanner of claim 5, wherein the reconstruction processor updates the initial image representation by repeatedly reloading the image memory with a backprojection of a plurality of data lines that correspond to a new full image.

7. The continuous CT scanner of claim 5, wherein the initial image representation is made up of a plurality of sub-images which correspond to pluralities of data lines, and updates are accomplished by repeatedly backprojecting a new sub-image, subtracting a previously backprojected sub-image that is 180° apart from the new sub-image, and superimposing the difference on the image memory.

8. The continuous CT scanner of claim 5, wherein updates are accomplished by taking a difference between a currently acquired plurality of data lines and a corresponding plurality of data lines previously acquired which are 180° apart from therefrom and inverted, and backprojecting the difference into the image memory.

9. The continuous CT scanner of claim 8, wherein the difference is taken at any time prior to its backprojection when the electronic data is in parallel-beam format.

10. The continuous CT scanner of claim 5, wherein the backprojected data lines of the image representation are weighted by a unity function having tapered ends such that those backprojected data lines at extremes under the tapered ends have less effect on the real time image representation than those backprojected data lines at a center which are unity weighted.

11. The continuous CT scanner of claim 10, wherein a number of data lines under the tapered ends is less than or equal to a number of data lines between updates.

12. A method of producing a continuous real time image comprising:
(a) rotating an x-ray source about an examination region;
(b) producing a fan shaped x-ray beam having a plurality of rays passing through the examination region while the x-ray source is continuously rotating;
(c) receiving rays of the fan shaped x-ray beam after they have traversed the examination region;
(d) converting the rays to data lines having a fan-beam format;
(e) interpolating the data lines from the fan-beam format to a parallel-beam format;
(f) reconstructing an image representation from the data lines in the parallel-beam format, said image representation being made up of a plurality of sub-images, each sub-image corresponding to a plurality of data lines; and,
(g) continuously updating the image representation in real time, wherein the updating includes:
backprojecting a new sub-image;
subtracting from the new sub-image a previously backprojected sub-image that is 180 degrees apart from the new sub-image to achieve a difference therebetween; and,
superimposing the difference on an image memory storing the reconstructed image.

13. A method of producing a continuous real time image comprising:
(a) rotating an x-ray source about an examination region;
(b) producing a fan shaped x-ray beam having a plurality of rays passing through the examination region while the x-ray source is continuously rotating;
(c) receiving rays of the fan shaped x-ray beam after they have traversed the examination region;
(d) converting the rays to electronic data having a fan-beam format;
(e) interpolating the electronic data from the fan-beam format to a parallel-beam format; and,
(f) continuously convolving and backprojecting the electronic data in the parallel-beam format to reconstruct and update in real time an image representation of a subject within the examination region.

14. The method of claim 13, wherein the step of reconstructing and updating includes:
convolving the interpolated electronic data; and,
backprojecting the convolved data to reconstruct and update the image representation in real time.

15. The method of claim 13, wherein the step of interpolating includes:
angular view filtering across data lines corresponding to the received rays;
sorting the data lines corresponding to received rays which are parallel to one another into groups wherein spacing within the groups is unequal; and,
adjusting the spacing within the groups to be equal.

16. The method of claim 15, wherein prior to angularly view filtering the data lines, the data lines are stored in a first rolling buffer, and after angularly view filtering the data lines, the data lines a stored in a second rolling buffer.

17. In a continuous CT scanner for producing a real time image having a stationary gantry portion defining an examination region, a rotating gantry portion for continuous rotation about the examination region, an imaging x-ray source mounted to the rotating gantry portion which produces a fan-shaped x-ray beam having a plurality of rays through the examination region, and a plurality of radiation detectors mounted to one of the rotating and stationary gantry portions and arranged to receive rays of the fan-shaped x-ray beam from the imaging x-ray source after the rays pass through the examination region, wherein the plurality of radiation detectors convert detected radiation into electronic data, the electronic data including a plurality of data lines in a fan-beam format, a data processor comprising:

a rebinning processor which interpolates the electronic data from the fan-beam format to a parallel-beam format, the rebinning processor including a first rolling buffer which stores the electronic data generated by the radiation detectors, an angular view filter which filters the electronic data, a second rolling buffer which stores the filter electronic data, and an interpolator which converts the electronic data form a fan-beam format to a parallel-beam format; and, a reconstruction processor which convolves and backprojects the electronic data in the parallel-beam format to form in real time an image representation of a subject within the examination region.

18. The data processor of claim 17, wherein the angular view filter is applied to a plurality of adjacent data lines to generate a weighted average thereof.

19. The data processor of claim 17, wherein the image representation is repeatedly updated in real time by taking a currently acquired plurality of data lines and a previously acquired plurality of data lines 180° apart therefrom, and backprojecting their difference.

20. The data processor of claim 17, wherein the image representation is repeatedly updated in real time by taking a currently acquired backprojection of a plurality of data lines corresponding to a new sub-image and a previously acquired backprojection of a plurality of data lines 180° apart therefrom corresponding to a prior sub-image, and subtracting the prior sub-image from the new sub-image.

* * * * *